April 16, 1968    TAKESHI GOSHIMA ET AL    3,377,936

EASY LOADING APPARATUS FOR FILM SUPPLY FOR PHOTOGRAPHIC CAMERAS

Filed July 22, 1965      11 Sheets-Sheet 1

INVENTORS
TAKESHI GOSHIMA, SYOHEI OHTAKI AND
BY NATSUO KINOSHITA

ATTORNEY

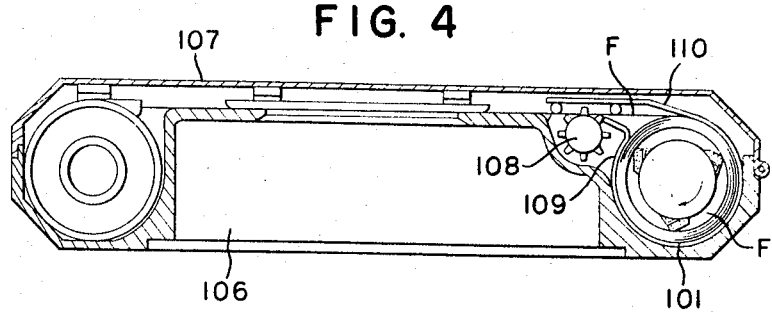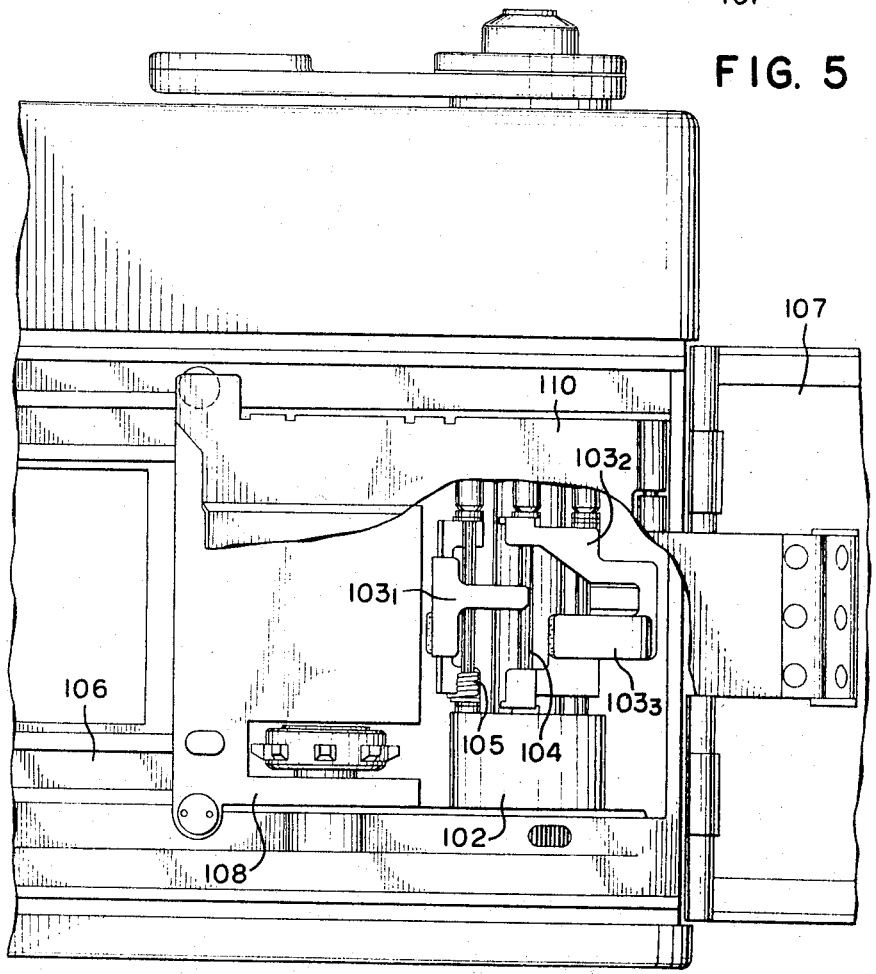

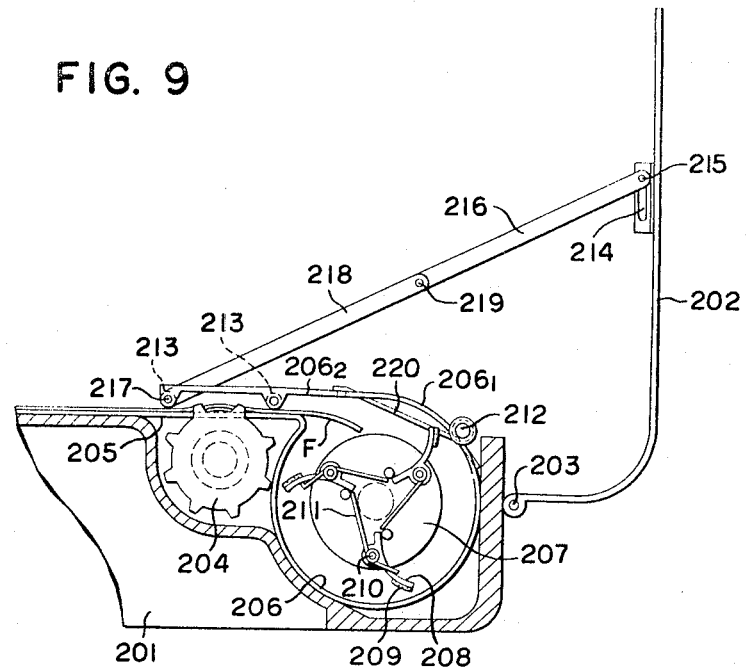
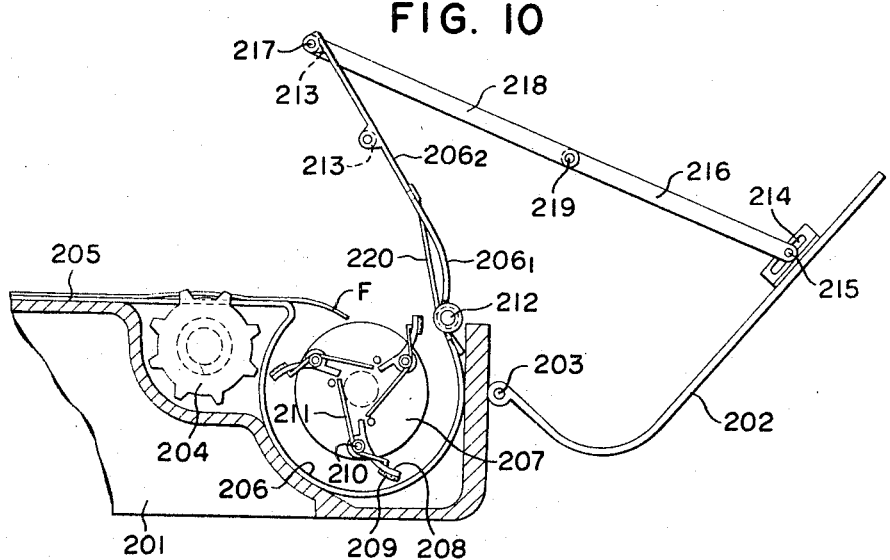

April 16, 1968 TAKESHI GOSHIMA ET AL 3,377,936
EASY LOADING APPARATUS FOR FILM SUPPLY FOR PHOTOGRAPHIC CAMERAS
Filed July 22, 1965 11 Sheets-Sheet 7

INVENTORS
TAKESHI GOSHIMA, SYOHEI OHTAKI AND
BY NATSUO KINOSHITA

ATTORNEY

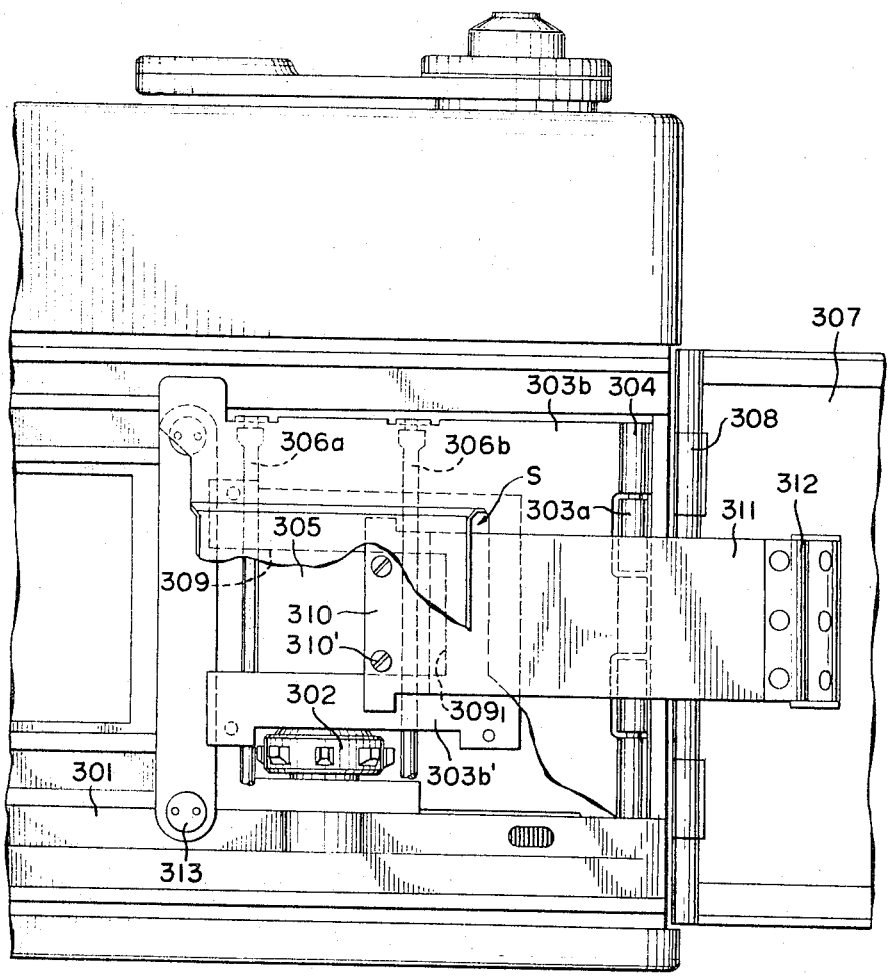

April 16, 1968     TAKESHI GOSHIMA ET AL     3,377,936
EASY LOADING APPARATUS FOR FILM SUPPLY FOR PHOTOGRAPHIC CAMERAS
Filed July 22, 1965            11 Sheets-Sheet 10

INVENTORS
TAKESHI GOSHIMA, SYOHEI OHTAKI AND
BY   NATSUO KINOSHITA
ATTORNEY

April 16, 1968    TAKESHI GOSHIMA ET AL    3,377,936
EASY LOADING APPARATUS FOR FILM SUPPLY FOR PHOTOGRAPHIC CAMERAS
Filed July 22, 1965    11 Sheets-Sheet 11

INVENTORS
TAKESHI GOSHIMA, SYOHEI OHTAKI AND
BY   NATSUO KINOSHITA

ATTORNEY

United States Patent Office 3,377,936
Patented Apr. 16, 1968

3,377,936
EASY LOADING APPARATUS FOR FILM SUPPLY FOR PHOTOGRAPHIC CAMERAS
Takeshi Goshima and Syohei Ohtaki, Tokyo, and Natsuo Kinoshita, Yokohama-shi, Japan, assignors to Canon Camera Kabushiki, Kaisha, Tokyo, Japan, a corporation of Japan
Filed July 22, 1965, Ser. No. 473,922
Claims priority, application Japan, July 27, 1964, 39/42,735
11 Claims. (Cl. 95—31)

ABSTRACT OF THE DISCLOSURE

Film loading apparatus for a camera in which the take-up spool is provided with spring biased friction members to form winding layer loops of film against the inner surface of the film winding chamber, the friction members being moved radially by the build up of the film layers within the chamber.

---

The instant invention relates to an easy loading apparatus for the film supply for photographic cameras in which the film supply, fed by means of a sprocket or the like, is automatically wound on a spool by friction to be imparted by a set of friction members provided thereon when the camera is loaded.

When loading conventional cameras with a fresh film supply, the leading end of the film is manually either placed into, or folded and hung in, a slit provided in the spool. Such manual operation is not only tedious but also uncertain of result.

There is also known a device where the winding shaft for the film supply in the film chamber is covered with a friction-layer of rubber and the like, a pressure means for the film supply to be pressed against the winding shaft simultaneously being provided for enabling the film being fed into the film chamber to be wound around the winding shaft. In such device, however, the necessity for the leading end of the film supply to advance against the pressure means, results in the formation of a loose section in the front end portion of the film strip and an interruption in winding. A similar device where the winding shaft for the film supply in the film chamber is provided with an appropriate number of projections, instead of said friction-layer of the rubber, etc., complementary to the perforations of the film strip, experienced the similar defect of the absence of the desired secure and uninterrupted automatic interlocking because of the displacement of the position of the perforations of the film strip as this is wound.

In accordance with the present invention, there is provided in the cylindrical film chamber a spool having a set of rising and sinking friction members which help the film supply, as it is fed into the film chamber by means of a film feed mechanism, in the forward movement of the leading end thereof and in the formation of turns of the film winding oriented from the outside and advanced to the inside along the wall of the film chamber, these friction members being so arranged that the configuration of the plurality of the members reduce outer diameter of the film coil as the number of the film coil increases in number.

It is additionally noted that the apparatus in accordance with the invention is provided also with a film guide member, for achieving more simplified, faster and insured accuracy of, loading of the camera with a supply of film in interlocking relation with the opening and closing operation of the back plate of the camera body. In loading, the perforations of the film strip are complementarily engaged with the sprockets, the film strip is examined for correct positioning before completely closing the back plate of the camera, so that after complete closure of the back plate, the film supply may be automatically wound up on the take-up spool in the winding operation.

Furthermore, in accordance with the invention, in addition to the positive winding operation of the film supply by means of friction members, means are provided for avoiding the interruption of the film advance which might possibly be caused by engaging a corner of the leading end of the film with a perforation of a succeeding portion of film.

It is an object of the invention to provide a device for easy-loading apparatus for film supply for photographic cameras which is simplified in structure, stabilized in operation, and extremely facile in handling.

It is another object of the invention to provide a device for easy loading apparatus for film supply for photographic cameras which has a provision of a film guide member which makes it possible that, in loading, the judicious position of the perforations of the film strip in engagement with the complementary teeth of the sprockets is maintained until complete closure of the back plate of the camera, and, after complete closure, the film supply is automatically wound on the take-up spool as film winding progresses.

It is still another object of the invention to provide a device having a means which is capable of very smooth automatic and uncurled winding of the leading end of the film feed in layer on the spool, which is fed into the film chamber by means of the film feed mechanism such as sprockets, etc., as a result of friction action by a set of friction members provided on the spool.

It is another object of the invention to provide an easy loading apparatus for applying film to photographic cameras in an amount enabling the taking of more pictures than do the so called Kodak Instamatic and Agfa Rapid systems, despite the same camera size.

Other objects, advantages and features of this invention will become more apparent from the following description of several illustrative embodiments when read in conjunction with the drawing, in which:

FIGURE 4 is a cross section of a camera provided with a second illustrative embodiment of the invention;

FIGURE 5 is a side sectional view of the camera illustrated in FIGURE 4;

FIGURES 8 to 11 are sections of the inventive apparatus in the form of FIGURE 7 in sequential order and in stages of operation of its components from starting to open until complete opening of the back plate of the camera body;

FIGURE 16 is an elevational view of that important portion of the camera when its back plate is half opened;

Figure 1:
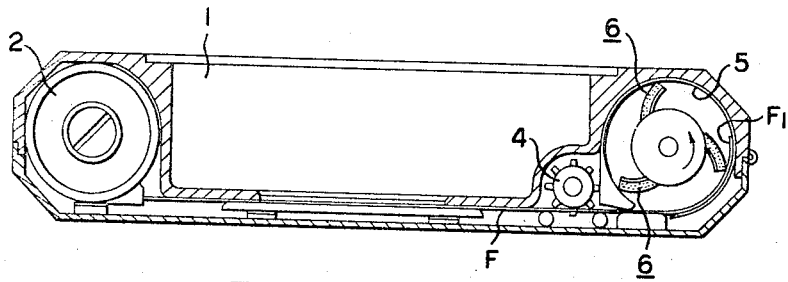
FIGURE 1 is a cross section of a camera provided with an illustrative embodiment of the invention.
Figure 2:
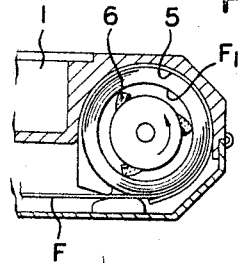
FIGURE 2 is a sectional view of the important portion of the camera of FIGURE 1 with a fair length of a film supply being wound up.
Figure 3:
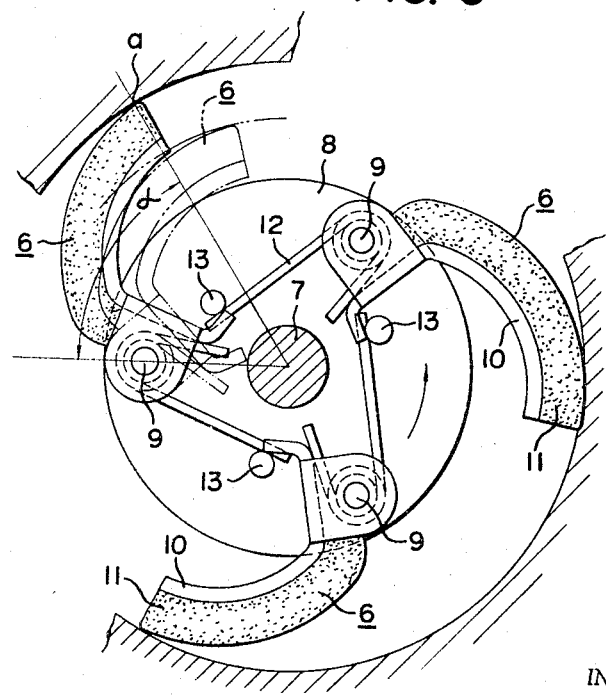
FIGURE 3 is an enlarged sectional view of the important portion of the camera illustrated in FIGURE 1.

Referring to the drawing, in camera 1 illustrated in FIGURES 1 and 2, the film supply F drawn from cartridge 2 is fed by a film feed mechanism such as sprocket wheel 4 or a roller into cylindrical film chamber 5 to be wound into a roll along the cylindrical wall surface of film chamber 5. When the number of layers of the winding is increased, friction exerted between the layers prevents the inner diameter of the winding layers from being reduced in size which prevents feeding the remainder of the film supply. In order to avoid this defect, in accordance with the embodiments of the invention, a rotatable spool is provided in film chamber 5, which spool has friction members 6 for helping the forward movement of the leading end region $F_1$ of film supply F. The friction members 6 automatically reduce themselves in outer diameter, i.e. the distance from the vertical axis of the spool to the outer ends of members 6, as the winding of the fed film increases in the number of its turns within chamber 5. As shown in greater detail in FIG. 3, the assembly of the spool having friction members 6 is as follows: axle 7, borne on the upper and lower surfaces of film chamber 5, has affixed thereto turning discs 8 spaced axially thereof, which have arcuate supporting arms 10 pivoted by pins 9 thereon. Supporting arms 10 on the outer surface thereof have friction elements 11 made of rubber or synthetic resin. Springs 12 urge friction elements 11 to move radially outwardly and press against the inner side of the film feed, springs 12 lying between supporting arms 10 and studs 13, the latter simultaneously serving as limiting stop means for the adjacent supporting arms. Preferably a plurality of friction members 6 equally spaced from one another in a circle are provided, with each member being pivotally pinned by a pin 9 at a point angularly advanced by angle $\alpha$ in the direction of rotation from point $a$ at which the surface of the fed film contacts with the member so that the winding of the film may readily be reduced in outer diameter as the number of turns of the fed film increases. Friction members 6 may be in the form of fins, radial projections, and the like; in any event, they must be susceptible of being reduced in their outer diameter by lowering themselves in the direction opposite to the direction of rotation. When the film supply F is fed into chamber 5 by sprocket wheel 4 as illustrated in FIGURE 1, the leading end $F_1$ thereof is held between the wall of chamber 5 and one of the friction members 6 which are rotated in interlocked relation, that is, positively, with the film feed mechanism. Rotating friction members 6 press the film with a suitable pressure against the cylindrical wall surface of film chamber 5 to advance it into chamber 5 while simultaneously reduce the radius of operation of friction members 6 against springs 12 as the winding of the fed film increases the number of layers or turns. In this form of embodiment of the invention, the turns of the film winding are formed in the film chamber in the direction inside from outside with the leading portion of the film supply being helped, in its smooth receipt and forward movement, into the chamber and the friction members reducing in their operative radius, so that the film being fed is wound more tightly and in greater amount, and simultaneously, the easy loading operation being assuredly performed without difficulty. It is additionally to be noted that the slipping movement between turns of the fed film wound may occur in a suitable amount and frequency to assure appropriate operation, since each friction member is arcuately shaped and axially held at a point angularly anterior to the contact point with the surface of the film so that it naturally moves inwardly according to the increase in the number of turns of the fed film.

Figure 6:
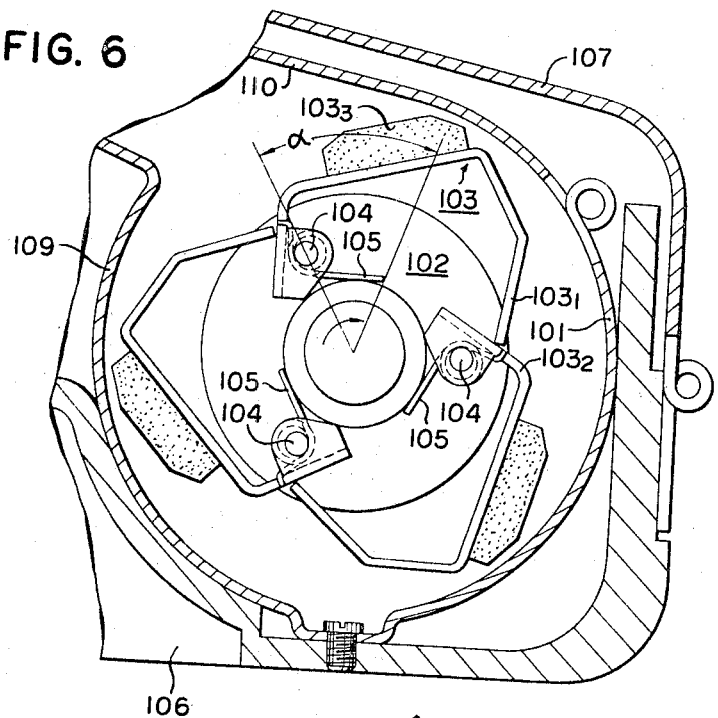
FIGURE 6 is a top plan view with a sectional view of the important section of the camera provided with the second illustrative embodiment of the invention of FIGURE 4.
Figure 8:
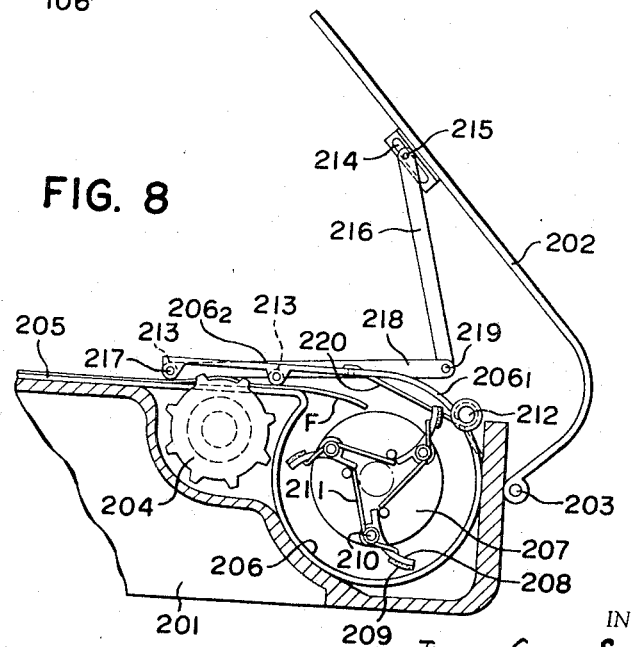

In a second illustrative embodiment of the invention, illustrated in FIGURES 4, 5 and 6, each friction member 103 has its contact point with film strip F selected at a point angularly anterior by angle $\alpha$ to stud 104. As evidenced by FIGURE 5, the free end of supporting arm $103_1$ of friction-member 103 is extended to lie on the base of supporting arm $103_2$ of the immediately preceding friction member 103, such successively preceding and following friction member being disposed with suitable clearances so that they offer no interference to each other when they rise and depress with their friction elements $103_3$ as the coil of layers of the fed film in film chamber 101 increases in size, each friction member 103 depressing deeper towards the center of rotation of the take-up spool, the body of each friction member 103 having its part $103_1$ approach near and finally entering the depression between parts $103_2$ and $103_3$ (FIG. 5). The body of each friction member 103 is, for example, of metal, hard synthetic resin, etc., to which is glued friction element $103_3$ of rubber, soft synthetic resin, etc., which faces the film strip. Referring to FIGURE 4, the camera body is designated as 106, the back plate as 107, the sprocket wheel as 108 and portions of a guide as 109 and 110 for smoothly introducing the film supply into chamber 101. Referring to FIGURES 4 and 6, when spool 102 and friction member 103 are rotated, in interlocking relation with the winding shaft for winding the film supply in the arrow-indicated direction, the film supply or strip F fed in by sprocket 108, or other suitable feeding roll, comes into contact with friction element $103_3$ which in turn rotates pressing the film strip F against the internal wall of film chamber 101. Therefore, since pivot 104 lies at a delay angle which results in the rising of friction member 103, should the resistance be strong, the force for frictionally feeding the film and for tightly winding it along the wall of the film chamber, is effectively increased. Furthermore, since successive preceding and following friction members 103 have their free ends $103_1$ overlie on bases $103_2$ of the supporting arms, there is no such possible defect as a curling-in of the film leading end in the interspace between spool 102 and friction members 103.

Referring now to FIGURES 7 to 13, which illustrate a third illustrative embodiment of the invention, the camera body is designated as 201, the back plate as 202 which is hinged at pin 203 for opening and closing, the sprocket as 204, the guide plate as 205, the cylindriform film winding chamber as 206 and is an extension of guide plate 205, the spool as 207 having a pluralities of radial friction members 208 and is disposed in film winding chamber 206. The spool is rotated by gearing (not shown) which is interlocked with the winding shaft whilst pressure is applied thereby by friction elements 209 to the film strip supply against the internal wall of film winding chamber 206, the friction elements being of such material as foamed latex, synthetic resin, etc. Friction members 208 are designed to depress, against the tension of springs 211, around pivot pins 210, according as the coil of the fed film supply increases in diameter in the film winding chamber. With such an easy loading mechanism, it was necessary heretofore to close the back plate of the camera after the fed film has advanced into winding chamber 206 until it is held by one of friction members 208.

Figure 11:
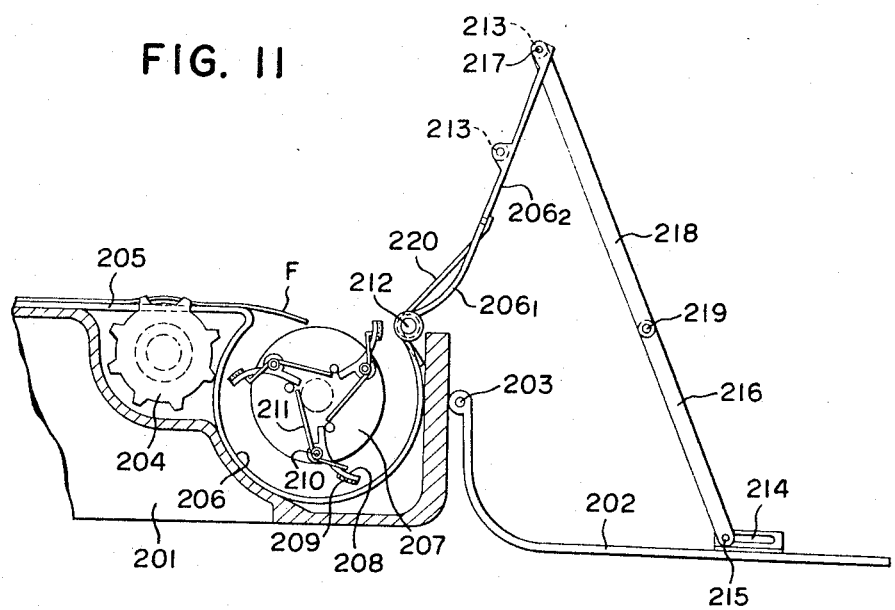
Figure 12:
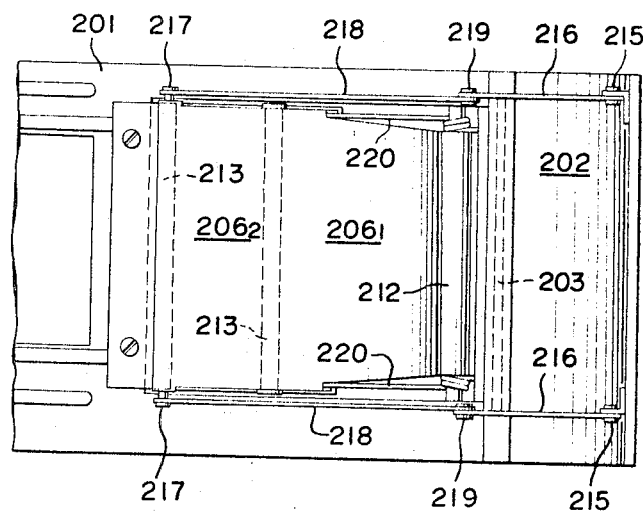
FIGURE 12 is a top plan view of the invention apparatus when at the stage illustrated in FIGURE 9.
Figure 13:
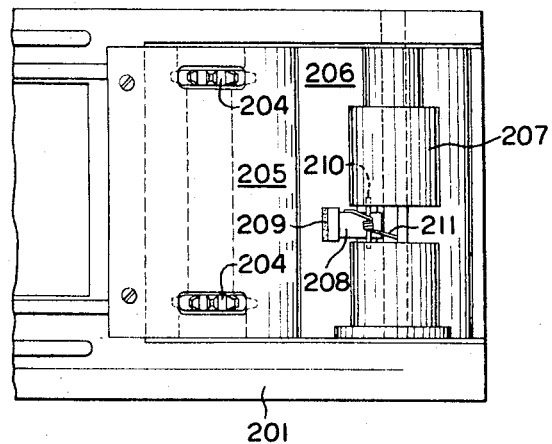
FIGURE 13 is a plan view of the operatively participant part of the camera body as positioned in the stage of operation illustrated in FIGURE 11.

On the contrary, with the third illustrative embodiment of the invention illustrated in FIGURES 7 to 13, the loading of the film supply is completed when the film feed F is placed on sprocket 204 after back plate 202 is opened, and then re-closed. In this embodiment, a portion of film winding chamber 206 is divided into another chamber $206_1$ which is connected to chamber 206 by pin 212; divided chamber $206_1$ being extended as far as sprocket 204 to prepare film guide $206_2$. As back plate 202 is being closed, film guide $206_2$, interlocked therewith, presses film F against guide plate 205 prior to the complete closure of back plate 202. In this design, it is preferable that rollers 213 rather than projections be provided, for pressing the fed film against it, on film guide $206_2$. The interlocked action of guide $206_2$ and back plate 202 may be produced by suitably combining such elements as a lever, link and the like, and in the illustrated form of this embodiment of the invention, use is made of arm 216 which is interlocked with back plate 202 by means of slot 214 and pin 215, arm 218 which is interlocked with guide $206_2$ by pin 217, with arms 216 and 218 being connected by pin 219. As illustrated in FIGURE 11, with such structure, when back plate 202 is completely opened, arms 216 and 218 are extended in alignment, guide $206_2$ and divided chamber $206_1$ are together raised around pin 212 against pressing spring 220, and guide plate 205 and a part of winding chamber 206 have an open space therebetween as illustrated in FIGURES 10 and 11. Supply film F is then drawn out to such extent as its front or leading end reaches winding chamber 6, placed on guide plate 205 and sprocket wheel 204, and as back plate 202 is closed. When back plate 202 is raised approximately by 90°, through the stage shown in FIGURE 10, loading of the film is practically completed as illustrated in FIGURES 9 and 12 with, guide $206_2$, rollers 213, pressing the film supply, and divided chamber $206_1$ forming a division of film winding chamber 206. The remaining operation is only the folding of arms 216 and 218 in the subsequent closing of back plate 202. Opening the back plate results in the reverse of the operational sequence described above. In the form of this illustrative embodiment, while back plate 202 swings 180° to perform the film loading, it should be noted, however, that lesser angular swing the back plate is sufficient for the loading operation, should other suitable interlocking structure be selected.

Figure 7:
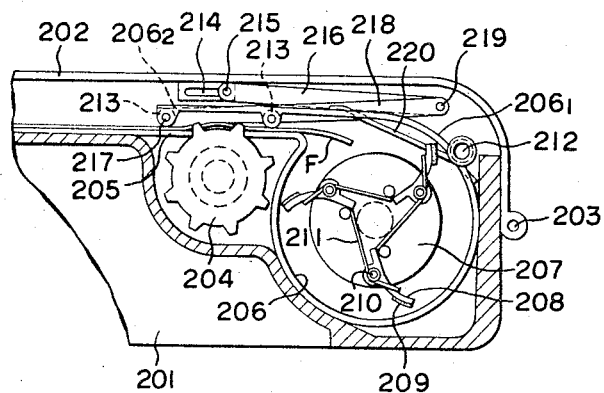
FIGURE 7 is a cross section of that portion of the camera provided with a third illustrative embodiment of the invention as positioned when the back plate of the camera is completely closed.
Figure 7A:
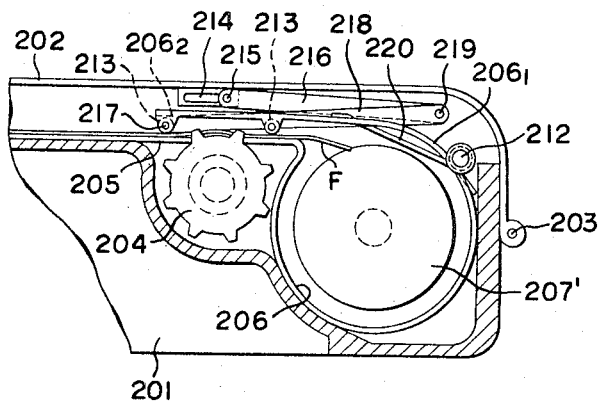
FIGURE 7A is a similar view to FIGURE 7, but in this figure a usual spool is employed instead of the spool having friction members.

FIGURE 7A shows a sectional view of a modification of FIGURE 7. In FIGURE 7A, usual spool 207′ is used instead of spool 207 of FIGURE 7 having friction members 208. Other elements are essentially the same as shown in FIGURES 7 to 13.

Figure 15:
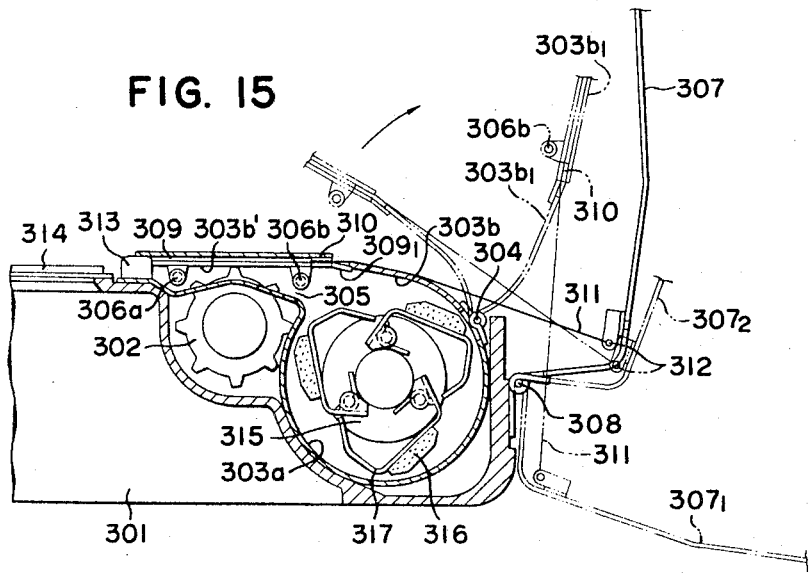
FIGURE 15 is a cross sectional view of the inventive embodiment of FIGURE 14 illustrating the operational sequence.
Figure 14:
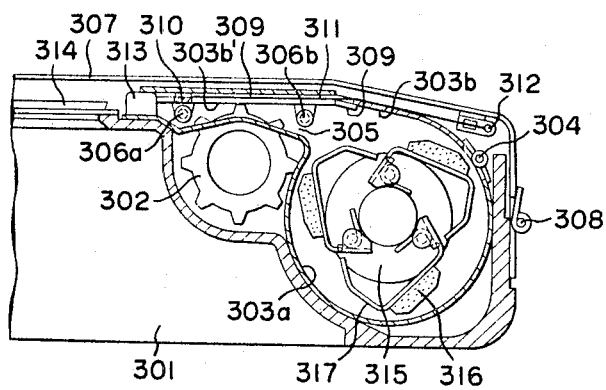
FIGURE 14 is a cross section of a camera provided with a fourth illustrative embodiment of the invention as it is positioned with the back plate of the camera body completely closed.

Referring now to FIGURES 14 to 16 which disclose a fourth illustrative embodiment of the invention, the camera body is designated as 301, sprocket wheel as 302, sections which make up a cylindrical film chamber and film guide covers, are designated as 303a and 303b, respectively, the former being firmly affixed in camera body 301 and the later hinged to 303a at pin 304. There is an opening between sections 303a and 303b which serves as film passage 305. At its position in the forward direction, that is, in the film feeding direction, of passage 305 an extension, film pressing element 303b′, is provided either integrally from film guide cover 303b or communicatively connected thereto, which element 303b′ on its rear face and straddling over sprocket 302, and to both sides thereof, has rollers 306a and 306b for pressing the film supply. The back plate is designated as 307 and is hinged to camera body 301 by pin 308, back plate 307 being interlock in movement with film guide cover 303b, the interlocking being effected by such design that there is provided, at its underside at its back and front regions a rail-shaped guide 309 to which is slidably secured slider 310 which, in turn, is connected to back plate 307 at suitable regions by plate spring 311. The hinge for plate spring 311 is designated as 312, the stop as 313 for determining the position of film pressing element 303b′, the pressure plate as 314, the automatic film winding spool as 315 which is provided with rising and depressable friction members 317 with friction elements 316 for pressing the film supply against film guide 303a and wind the film on the spool in chamber 303a. Referring now to FIG. 16, film guide cover 303b is hinged at its one end by pin 304 and constitutes a film presser together with element 303b′ which is fixed to 303b by screws. Film guide cover 303b at its central portion has a channel like cover to form a space S (FIG. 16) between the cover and element 303b′. Both front ridges of slider 310, which is secured to the front end of plate spring 311, can slide within space S. Element 303b′ has guide sides 309, which in association with pins 310′ provided on slider 310 and projected into the housing, define the sliding movement of slider 310. As explained hereinafter, plate spring 311 is connected to back plate 307, and consequently, slider 310 fixed to plate spring 311 is able to slide to the right and left (in FIG. 16) according to the opening and closing operation, respectively, of cover plate 307. When cover plate 307 is being opened, slider 310 advances to the right until pins 310′, projecting from slider 310 engage with rear end side $309_1$ of element 303b′, and further opening operation of back plate 307 urges film guide cover 303b and element 303b′ to rise up about hinge 304 with the aid of spring 311.

With such structual design, back plate 307 is opened by some 180° along chain line $307_1$ as illustrated in FIGURE 15. During the course of the first, about 90°, opening operation, slider 310 moves along guide 309 and during the following course of the following about 90° opening, slider 310 which is connected to spring 311 is engaged with the rear end $309_1$ of guide 309, raising guide covers 303b and 303b′ by some 90° as far as the position of $303b_1$ and $303b_1′$. In this stage of opening, the supply of film is loaded. The front end portion of the film feed is positioned as to have its perforations engaged with sprocket wheel 302, and when back plate 307 is closed by some 90° through stages $307_1$–$307_2$–307, as illustrated in FIGURE 15, guide cover 303b, 303b′ is depressed under the tension of spring 311 and press the film as illustrated by the full line in FIG. 15; therefore the hand may be removed from the film strip. With the further turn of back plate 307 to closure, namely through some 90°, spring 311 is returned to its original place with slider 310 proceeding along guide 309, so that back plate 307 is folded as illustrated in FIGURE 14.

With the illustrative embodiment of the invention as disclosed in FIGURES 14 to 16, the back plate and the guide cover are connected or linked by a spring provided with idle sliding, and the film is released when the film supply is to be unloaded, in interlocking relation with the opening operation, which should follow about half the necessary opening angle. In loading the film supply, the operation is reversed, namely, in the first half of the closing operation of the back plate, the guide cover is closed, and in the latter half of the closing operation, the interlocking springs is advanced along guide 309 to be included within guide 309. Generally, such interlocking mechanism as in the illustrative embodiment of the invention disclosed in FIGURES 7 to 13 works with a combination of several links. However, the space available for loading the film is limited, so that much effort is required to building-in such link assembly which often lacks smooth operation. With the illustrative embodiment of the invention shown in FIGURES 14 and 15, building-in the mechanism is easy by utilizing the narrow space between the back plate and the camera body, and is also structurally simplified since it requires no more than a single plate spring sheet for interlocking.

With the forms of embodiment of the invention illustrated in FIGURES 7 to 13 and FIGURES 14 to 16, closure of the back plate completes the film loading, with the film being advanced sufficiently far into the fed film winding chamber, the film is prevented from springing off by the use of pressure without it being necessary completely to close the back plate of the camera body, with the result that the loading of the film supply is very greatly simplified and much more rapidly completed.

Figure 14A:
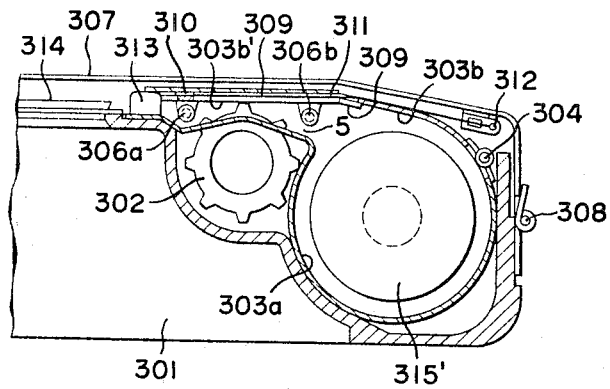
FIGURE 14A is a similar view to FIGURE 14, but in this figure a usual spool is employed instead of the spool having friction-members.

FIGURE 14A shows a sectional view of a modification of FIGURE 14. In FIGURE 14A, usual spool 315' is used instead of spool 315 of FIGURE 14 having friction members 317. Other elements are essentially the same as shown in FIGURES 14 to 16.

Figure 17:
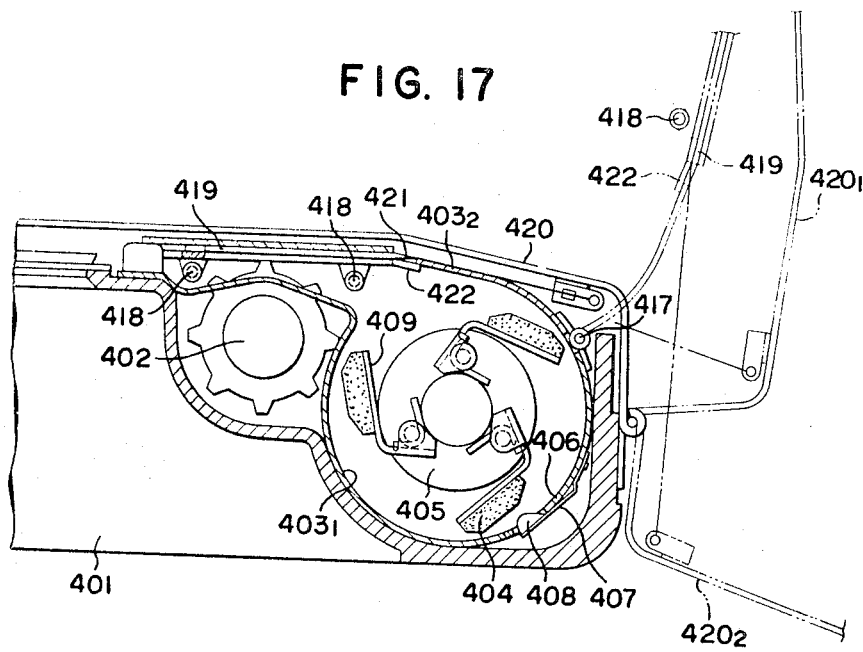
FIGURE 17 is a plan view of a part of a camera provided with still another illustrative embodiment of the invention as it is positioned when the back plate of the camera is fully closed.
Figure 18:
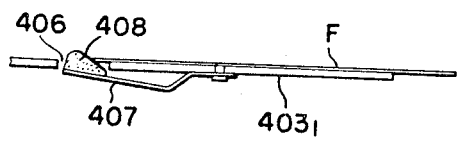
FIGURE 18 is a development on an enlarged scale of a detail of the apparatus as it is positioned in FIGURE 17.
Figure 19:
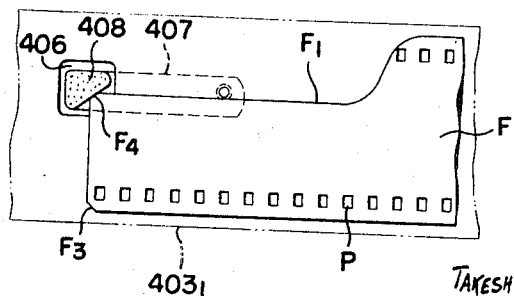
FIGURE 19 is a cross section for illustrating the operational movement of the embodiment of FIGURES 17 and 18 in the position therein illustrated.
Figure 20:
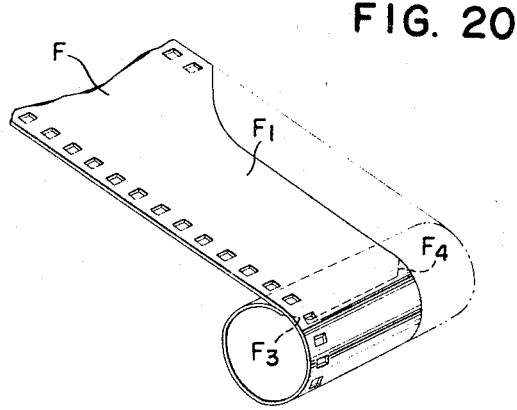
FIGURE 20 is a perspective view of the top end region of a film supply as inserted, for the purpose of illustrating the operational movement of the illustrative embodiment of FIGURES 17-19.

Still another form of embodiment of the invention is illustrated in FIGURES 17 to 21. Referring to FIGURE 17, film supply F, by a feeding mechanism, such as sprocket wheel 402 or the like, is wound in the cylindriform film chamber $403_1$ and $403_2$ from the outer into the inner side in turns along the internal wall of the chamber in camera body 401. In the film winding chamber film spool 405 is provided having friction members 404 which lead and help the forward movement of the leading end of the film supply and, as the film turns increase in number, they are diminished in diameter their circular configuration whilst functioning to press the turns from the outside. In this form of embodiment, the winding of the film supply takes place automatically and positively with the help of the forward movement energy of the film supply F as this is fed by the feeding mechanism, and there can be no possibility of faulty film loading so long as the film strip is engaged for example with the sprockets 402 of the feeding mechanism. However, the film strip is generally provided with a film leader $F_1$, as illustrated in FIGURE 19, with the top corner cut away as at $F_3$, and this corner part, representing a corner angle and catching the film perforation, often gives rise to the possibility that the film strip is prevented from decreasing the looping of film. To provide against each possibility, in accordance with the invention a means is provided for disaligning the corner angle $F_3$ from the line of perforations on the film strip preceding the winding of the film by friction members 404, namely, by pressing the film leading end in a safe direction. Referring to FIGURES 17–19, an opening 406 is provided in a position which lies out of the advancing loci of friction members 404 and in a portion of film winding chamber $403_1$, as illustrated in FIGURE 19, but which opening lies in the advancing loci of the leading end $F_4$ of the film leader; a protrusion 408 being provided from outside of the winding chamber and supported on spring 407 to extend into the film winding chamber, press downwardly corner $F_4$ of the film front end whenever it comes to opening 406 and protrusion 408 to prevent the corner $F_3$ from being aligned with film perforations P. By such construction, any dissatisfactory operation such as previously mentioned, is avoided despite increase in the number of turns of the film fed into chamber 403, since the film is fed in turns of the winding with its leading end retaining its initial displaced position. Also, it is to be noted that no trouble can occur since protrusion or projection 408 is continuously pressed outwardly from the winding chamber against the urging of spring 407, and increasingly so, as the turns of the film increase in number.

Figure 21:
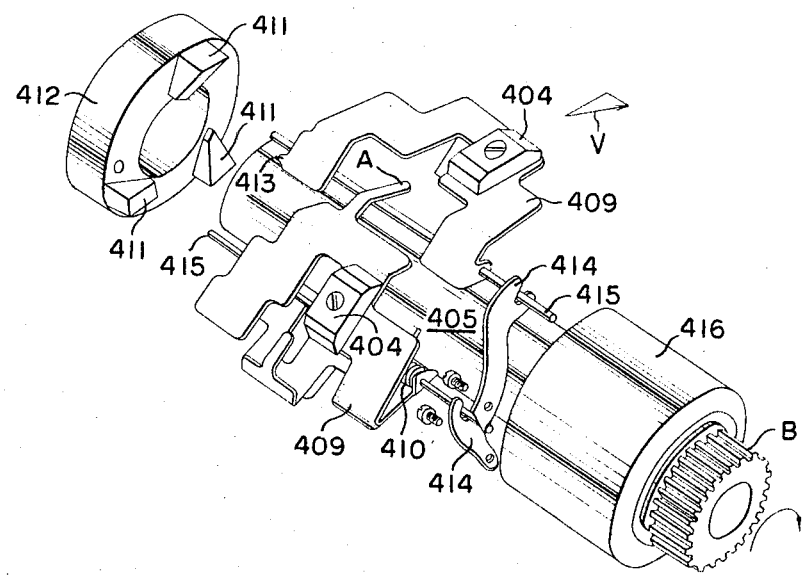
FIGURE 21 is a perspective exploded view of the elements of a modified form of the embodiment of the invention.

Referring to FIGURE 21, which illustrates another illustrative embodiment of the invention including displacing the corner angle from alignment with the line of film perforations line by pressing against the leading end of the film supply; rotatable element 405 to be rotated by rotor 416 through gear B fixed thereon is provided with a raisable set of supporting arms 409, rotatably mounted on respective shaft 415 affixed to rotor 416 and cam disc 412, each arm provided with a friction member 404 continuously tending to be raised by spring 410 and which, while descending, press the fed film against the internal wall of the winding chamber against the pressure of spring 410 as the fed film increases in the number of turns in the film winding chamber. In this embodiment, one end of rotatable element 405 is provided rigidly with cam disc 412 supporting as many cams 411 in number as there are supporting arms 409, each of which being provided with a projection 413, and supporting arms 409 being urged by plate spring 414 to continuously engage projections 413 with related cams 411. And consequently, as supporting arms 409 are depressed in sequence as fed film is wound, each protrusion 413 moves to the higher portion of each cam 411 to let supporting arms 409 and friction members 404 to move to the right in FIG. 21. Thus, each friction member 404 moves in the direction of the composite vector V, pressing the supplied film F toward the direction of vector V and achieving the purpose of misaligning corner $F_3$ and the film perforations. Tongue portion A of supporting arm 409 prevents the leading end of the film to curl into the space between successive arms 409.

The same purpose may be achieved by the following construction: Shaft 415 along which supporting arms 409 elevate and depress, may be designed integrally to rotate with supporting arms 409; shaft 415 being threaded to engage in threaded holes provided at cam disc 412 and rotor 416; in which construction shaft 415 and supporting arm 409 may integrally move to the right or left guided by the threads, as supporting arms 409 are depressed or raised. Thus, each friction member 404 moves in the composite direction V, pressing the supplied film F toward the direction of vector V as supporting arms 409 are depressed in sequence.

What is claimed is:

1. A photographic camera provided with an easy loading apparatus for film supply comprising a film feeding mechanism, a cylindrical film winding chamber, a rotatable film winding shaft coincident with the central vertical axis of the film winding chamber and interlocked with the film feed mechanism, a spool disposed in the film winding chamber for taking up the film supply, a plurality of friction members on the spool, each friction member having a declinable supporting arm, spring means continuously biasing the supporting arm outwardly for foming a winding layer loop of the film supply fed into the film winding chamber in association with the film feed mechanism, and a friction element secured to the support arm.

2. A photographic camera provided with an easy loading apparatus for film supply according to claim 1, wherein said declinable supporting arm inclines in the direction opposite to the direction of rotation of the winding shaft.

3. A photographic camera provided with an easy loading apparatus for film supply according to claim 1, wherein said declinable supporting arm inclines to the direction of rotation of the winding shaft.

4. A photographic camera provided with an easy loading apparatus for film supply according to claim 1, wherein each supporting arm has an extension, the extension of the preceding supporting arm lying on the base portion of the succeeding supporting arm to prevent the front end of the film supply fed into the film chamber from being curled in the interspace between the spool and the friction member.

5. A photographic camera provided with an easy loading apparatus for film supply according to claim 1, where a projection is provided in the film winding chamber so as to guide the front end of the film to the normal position.

6. A photographic camera for use with a perforated film having a corner cut away from its leading edge and having an easy loading apparatus for the film supply according to claim 1, wherein means is provided to shift the friction members longitudinally, said means including a cam disc rotatable with the film winding shaft, cooperating camming means on said cam disc and on said friction members moving the friction means longitudinally as the friction members are moved radially by the increase in the number of coils of film in the film winding chamber so that the cut away corner passes smoothly over the perforations in the film.

7. A photographic camera including a film winding chamber, a back plate hinged on the camera body at the side of the film winding chamber, a film advancing sprocket adjacent the film winding chamber, a film guide plate hinged on the film winding chamber at the side of said hinge position of the back plate and extended to a position near to the sprocket, means interlocking the film guide plate and the back plate, the film guide plate being interlocked with the back plate in such a way that until the opening of the back plate by about 90 degrees the interlocking action failing to effectively work, but, further opening of the back plate causing to raise the film guide plate accompanied with the back plate.

8. A photographic camera according to claim 7, where the means interlocking the film guide plate with the back plate includes a spring sheet hinged on the back plate.

9. A photographic camera according to claim 7, where the means interlocking the film guide plate with the back plate includes a link mechanism.

10. A photographic camera according to claim 7, provided with an easy loading apparatus for film supply.

11. A photographic camera according to claim 7 provided with a conventional take-up spool.

References Cited
UNITED STATES PATENTS

| 1,346,356 | 7/1920 | Wenderhold | 242—55.1 |
| 2,266,426 | 12/1941 | Koszalka, et al. | 95—31 |

FOREIGN PATENTS

| 217,844 | 10/1961 | Austria. |
| 225,021 | 12/1962 | Austria. |

OTHER REFERENCES

Steisslinger, German printed application 1,115,571, printed Oct. 19, 1961 (KL57a 22/05), 95—31.

NORTON ANSHER, *Primary Examiner.*

J. F. PETERS, *Assistant Examiner.*